United States Patent [19]

Baisden

[11] 4,285,916

[45] Aug. 25, 1981

[54] EXHAUST GAS POLLUTION CONTROL SYSTEM

[76] Inventor: C. Robert Baisden, 11127 Willow Bottom Dr., Columbia, Md. 21044

[21] Appl. No.: 144,022

[22] Filed: Apr. 28, 1980

Related U.S. Application Data

[62] Division of Ser. No. 937,787, Aug. 29, 1978.

[51] Int. Cl.³ .............................................. F01N 3/10
[52] U.S. Cl. .................................... 423/212; 422/171; 422/211; 422/213; 252/477 R; 181/274
[58] Field of Search ............................... 422/169–171, 422/177, 180, 181, 191, 192, 211, 218, 213; 60/309, 311; 181/279, 280, 274; 423/212, 213.2, 213.5; 252/477 R

[56] References Cited

U.S. PATENT DOCUMENTS

| | | | |
|---|---|---|---|
| 1,906,956 | 5/1933 | Gold | 181/274 |
| 1,997,298 | 4/1935 | Hathorn | 181/274 |
| 2,371,583 | 3/1945 | Lincoln | 55/347 |
| 3,226,206 | 12/1965 | Hettich et al. | 422/171 X |
| 3,421,315 | 1/1969 | Katashiaoi | 60/309 X |
| 3,989,471 | 11/1976 | Nowak | 422/179 |
| 4,021,203 | 5/1977 | Givens et al. | 422/171 |
| 4,049,388 | 9/1977 | Scheitlin et al. | 422/171 |
| 4,050,903 | 9/1977 | Bailey et al. | 422/171 |

FOREIGN PATENT DOCUMENTS

556361 10/1943 United Kingdom ...................... 55/343

Primary Examiner—William A. Cuchlinski, Jr.
Attorney, Agent, or Firm—Morton J. Rosenberg

[57] ABSTRACT

An exhaust gas pollution control system (10) for purification of exhaust gases passing from a combustion chamber. The control system (10) includes a housing element (14) which extends in a longitudinal direction (12). The housing element (14) encompasses a plurality of exhaust gas purification elements (16) each of the elements (16) being discrete in nature. Each of the exhaust gas purification elements (16) form a generally donut shaped contour having a central passageway (32) and are formed in an open contour for introduction of the exhaust gases internal to the particular purification element (16). The exhaust gases enter each purification element (16) through an entrance passageway (44) and are accelerated therein. Particulate matter found in the exhaust gases are ejected through particulate openings (54). The exhaust gases are catalytically converted within internal chamber (40) of purification element (16) and then are reintroduced to central passageway (32) through gaseous ejection openings (58). The reintroduced gases are then passed to a next succeeding purification element (16) or a portion of the exhaust gases may be reintroduced into the particular purification element (16) through the entrance area (46).

7 Claims, 3 Drawing Figures

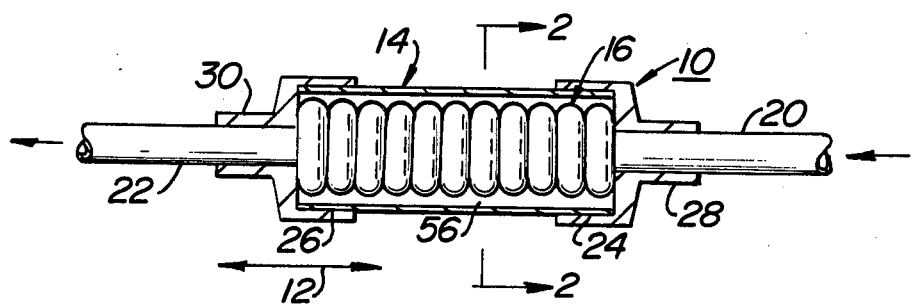
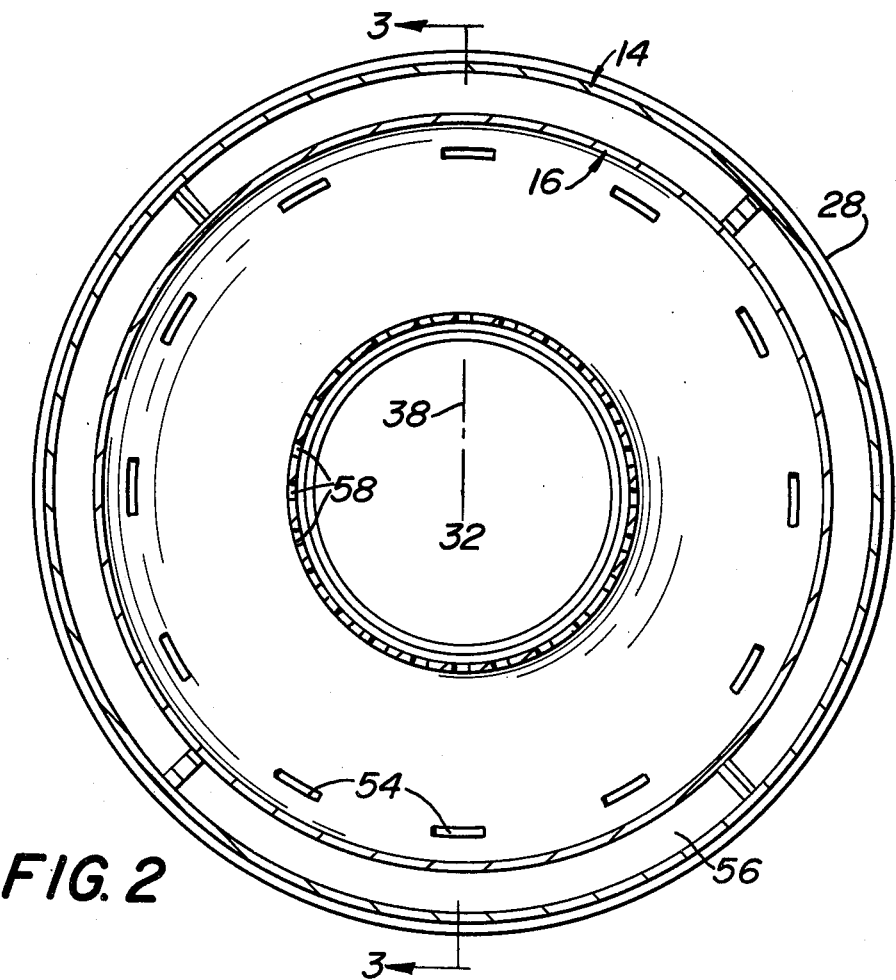

EXHAUST GAS POLLUTION CONTROL SYSTEM

This is a Division of application Ser. No. 937,787, filed Aug. 29, 1978.

BACKGROUND OF THE INVENTION

1. Field of the Invention

This invention is directed to pollution control systems. In particular, this invention is directed to exhaust gas pollution control systems. Still further, this invention pertains to exhaust gas purification systems which provide for collection of particulate matter contained within the exhaust gas. More in particular, this invention relates to exhaust gas purification systems that further reduce audio levels of exhaust gases being emitted to the atmosphere from a combustion chamber. More in particular, this invention pertains to purification systems which form chemical reaction chambers for chemical reactions which remove particular chemical constituents from the exhaust gases being purified. Additionally, this invention relates to purification of systems where exhaust gases are particularly directed internal to gas purification elements where chemical reactions of an advantageous nature may occur. Still further, this invention relates to gas purification systems which provide for a plurality of modular gas purification elements. Still further, this invention is directed to gas purification systems where such systems provide for audio and chemical purification. Additionally, this invention relates to gas purification systems which drive the exhaust gases through particular pathways internal to gas purification elements to provide increased purification processes.

2. Prior Art

Catalytic conversion systems for purification of exhaust gases are well-known in the art. The best prior art known to Applicant is contained within the following U.S. Pat. No. 4,050,903; No. 3,989,471; No. 3,226,206; No. 3,927,525; No. 3,687,637; No. 3,443,911; No. 4,021,203; No. 3,854,888; No. 3,912,459; No. 3,978,567; No. 4,049,388; and, No. 2,777,759.

The U.S. reference U.S. Pat. No. 4,050,903 is directed to a catalytic conversion system and a muffler. In this system, the gas passes through cone sections which causes secondary air to be forced through holes into the exhaust stream, passing through a subassembly. Subsequent to the mixture of the exhaust gases and secondary air, the combination is brought through a perforated bulkhead element which has a plurality of openings. These openings cause a back pressure on the combination of gases and distributes this over a monolithic catalyst coated element. However, such does not provide for the donut shaped catalytic converter sections or elements and does not provide for the particular flow of exhaust gases in the chemical reaction process as is necessary to the subject invention. Additionally, such is not directed to the modular concept of the donut shaped gas purification elements which is disadvantageous in labor saving and manufacture time constraints.

In the system shown in U.S. reference U.S. Pat. No. 3,989,471, there is a substantially radial flow type catalytic converter system having a monolithic refractory catalyst element. In the converter, the exhaust gases entering a bushing are directed in an outward manner by the flow distributor. The exhaust gases pass through openings between arches and then are brought to an inlet chamber. The inlet chamber is annular in contour and encompasses a catalyst element. The exhaust gases flow radially through the catalyst elements where the contaminants are converted. Subsequent to this flow, the gases then pass to an outlet chamber and exit the converter through another bushing. Thus, there is a somewhat radial flow of the gases to produce a swirling or vortexing effect, however, as in the other prior art cited, such systems do not provide for the plurality or multiplicity of donut shaped gas passage housings to provide a particular flow path which is highly efficient and to provide a system which is modular in nature.

SUMMARY OF THE INVENTION

An exhaust gas pollution control system for reducing exhaust gas audio levels, particulate and chemical waste materials emitted to the atmosphere subsequent to the exhaust gases passing from a combustion chamber. The exhaust gas pollution control system inlcudes a housing element extending in a longitudinal direction and at least one exhaust gas purification element inserted within the housing element. The exhaust gas purification element forms a generally donut shaped contour, having a central passageway and being of open contour for introduction of the exhaust gases internal to the exhaust gas purification element. The exhaust gas purification element further defines a predetermined contour wall member having openings formed therethrough for (1) directing particulate material external to the gas purification element, and (2) reintroducing the exhaust gases into the central passageway.

An object of the subject invention is to provide an improved exhaust gas pollution control system which acts as a muffler in combination with providing collection of particulate matter found within the exhaust gases as well as chemically purifying the exhaust gases.

A further object of the subject invention is to provide a gas pollution control system which is modular in construction and where further the elements may be removed easily each from the other to provide necessary maintenance.

A still further object of the subject invention is to provide a system which allows a collection of particulate matter prior to expulsion to an external atmosphere as well as to provide a compact chemically reacting set of chambers within which particular constituents may be removed from the exhaust gases.

A still further object of the subject invention is to provide a compact overall system which provides for a particular gas flow pathway within the system to maximize the amount of time that the gases are in contact with a chemically reacting portion of the system while simultaneously reducing the overall dimensions of the pollution control structure.

BRIEF DESCRIPTION OF THE DRAWINGS

FIG. 1 is a frontal view of the exhaust gas pollution control system showing the internal exhaust gas purification elements;

FIG. 2 is a sectional view of the exhaust gas pollution control system taken along the section line 2—2 of FIG. 1; and, FIG. 3 is a sectional view, partially cut-away, of the exhaust gas pollution control system, taken along the section lines 3—3 of FIG. 2.

DESCRIPTION OF THE PREFERRED EMBODIMENTS

Figure 3:
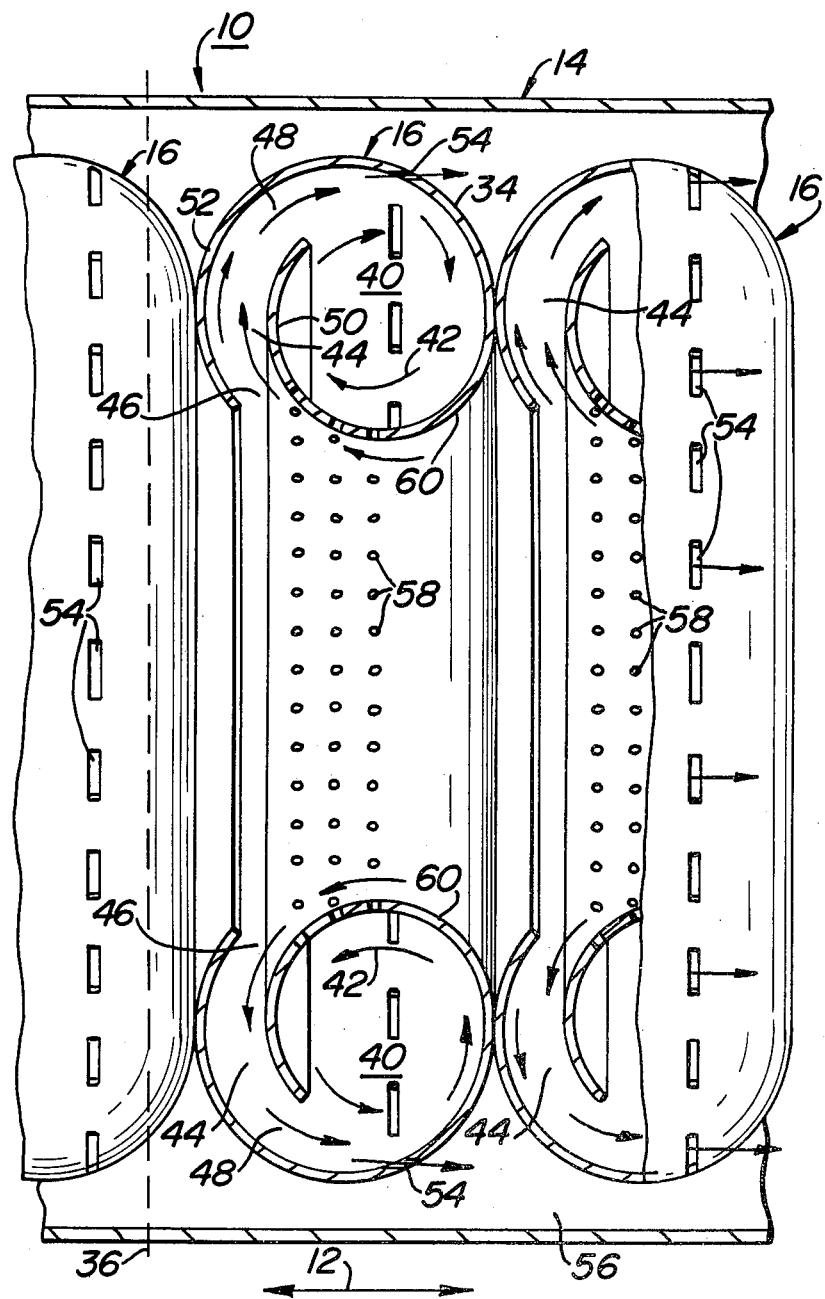

Referring now to FIGS. 1-3, there is shown exhaust gas pollution control system 10 for reducing exhaust gas audio levels, particulate and chemical waste materials emitted to the ambient atmosphere subsequent to exhaust gases passing from a combustion chamber. In overall concept, exhaust gases enter pollution control system 10 through entrance gas pipe 20, pass through system 10 in a manner to be described in following paragraphs, and exit from system 10 through exit gas pipe 22. The resultant products after passing from exit gas pipe 22 are emitted to the ambient atmosphere or other environment not important to the inventive concept as is herein described. Gas pollution control system 10 of the subject inventive concept provides for a multiplicity of results and acts as a muffler for reducing audio levels of the hot gases entering the gas pipe 20 from the combustion chamber (not shown). Additionally, as will be seen, system 10 allows for particulate ejection and collection within system 10. From certain combustion chambers such as vehicle engines, particulates in the micron dimension range have been found, and various prior system devices such as filters have been proposed for reducing any particulates being emitted to the ambient environment. However, such prior systems have been found to impede the flow of exhaust gases and reduce the efficiency of pollution control systems. Additionally, system 10 allows for extended paths of the exhaust gas with expansion and cooling to provide a muffling effect within pollution control system 10. Such has been found to substantially reduce the audio levels of gases being emitted to the environment and has sometimes been referred to as audio pollution. Still further, system 10 allows for a modular type construction device where elements may be inserted and removed to provide an optimization chemical reaction removal of chemical constituents from the exhaust gases passing therethrough.

Referring now to FIG. 1, there is shown housing or sheath element 14, extending in longitudinal direction 12. Sheath element 14 is generally tubular in overall contour and includes opposing longitudinal end sections 24 and 26. Housing element 14 serves as an enclosing chamber for exhaust gas purification elements 16 as well as a collection volume for particulate materials being emitted from the exhaust gases passing therethrough.

Housing element 14 may be formed of aluminum, stainless steel, or some like metallic composition not important to the inventive concept as is herein described, with the exception that the particular composition material provide for structural capabilities of maintaining exhaust gas pollution control system 10 in a secured manner within the environment wherein such is in operation. An internal diameter of sheath element 14 is dependent upon the amount of exhaust gas flow, the outer diameter of exhaust gas purification elements 16 as well as other criteria relating to the size of the combustion engine and the chemical constituents of the exhaust gas. The internal diameter of sheath 14 is not important to the inventive concept of the subject invention; however, an experimental system utilizes an internal diameter approximating 20.0 millimeters. The length in longitudinal direction 12 is dependent upon the number of gas purification elements 16 incorporated therein as is shown in FIG. 1.

As shown, sheath or housing element 14 is coupled to entrance gas pipe 20 and exit gas pipe 22 through clamp members 28 and 30. Clamp members 28 and 30 may be a standard split clamp having an internal diameter on one end thereof which is substantially equal to an outer diameter of sheath element 14. Additionally, a second internal diameter of clamps 28 and 30 are substantially equal to an external diameter of pipe members 20 and 22 respectively. In this manner, exhaust pipe members 20 and 22 are substantially connected to the internal volume of sheath element 14 for providing a directed flow of exhaust gases through exhaust gas pollution control system 10. Securement of clamp member 28 and 30 to pipes 20 and 22 as well as housing element 14 may be through a friction fit, bolting, or some like technique not important to the inventive concept as is herein described.

As shown in FIGS. 1-3, exhaust gas pollution control system 10 includes at least one exhaust gas purification element 16, which is inserted within a housing element 14. Exhaust gas purification elements 16 form a generally donut shaped contour, each having a central passageway 32. As will be shown in following paragraphs, and as is clearly seen in FIG. 3, exhaust gas purification element 16 is of open contour for introduction of the exhaust gases internal to gas purification element 16. Each of exhaust gas purification elements 16 defines predetermined contour wall 34, which includes openings formed therethrough for (1) directing particulate material external to gas purification elements 16, and (2) reintroducing exhaust gases into central passageway 32. For purposes of geometric clarity, exhaust gas purification wall member 34 is seen to form a substantially annular contour in first plane 36 shown in FIG. 3 as a dotted line and defining the plane of the paper as shown in FIG. 2. First plane 36 is a normal to longitudinal direction 12 as provided in FIGS. 1 and 3. Additionally, contour wall 34 provides a substantially truncated sprial wall contour in second plane 38 which lies substantially normal to first plane 36 and with the spiral contour seen in FIG. 3.

Referring now to FIG. 3, each of exhaust gas purification elements 16 includes a mechanism for directing and increasing the velocity of exhaust gases passing through central passageway 32 upon introduction of the exhaust gases internal to gas purification elements 16 within internal chambers 40. Exhaust gases passing within internal chambers 40 are driven in an arcuate manner as provided and seen by the arcuate directional arrows 42.

Each of purification elements 16 includes entrance passageway 44 having entrance area section 46 adjacent central passageway 32. Additionally, exit area section 48 is provided internal each of gas purification elements 16 with entrance passageway 44 defining an increasing exhaust gas flow area between entrance area section 46 and exit area section 48. Entrance passageway 44 is defined by inner wall 50 and outer wall 52 which are seen to be in overlapping relation with each other being displaced from the other. Inner and outer walls 50 and 52 are contoured to provide increasing flow area from central passageway 32 to internal chamber 40. As is clearly seen, the spiral contour of wall 34 provides for arcuately directing the exhaust gases internal to gas purification element 16. Inner and outer walls 50 and 52 having the particular contour to provide an increasing flow area between entrance area 46 and exit area 48 establishes a Venturi or nozzle like effect which increases the velocity of the gases which are passing through a central passageway 32. This contour also has the effect of causing an expansion of the gases during a cooling phase and thus provides for a muffling effect in overall gas pollution control system 10. The muffling effect or audio level reducing effect is also provided by the increased travel displacement of the exhaust gases within internal chamber 40 of gas purification element 16.

Additionally, with the increase of the velocity of the exhaust gases internal to the gas purification elements 16, there is provided a centrifugal effect on the exhaust gases. Particulate matter within the exhaust gases even though being in the micron dimensional range have a larger mass than the surrounding gases. Due to the effects of centrifugal actions and reactions, the particulate material is driven outward in a radial direction toward an inner wall surface of contour wall 34. It is noted that the spiral contour of wall 34 maintains the arcuate direction 42 of the exhaust gases within purification elements 16.

Particulate ejection openings 54 are formed through contour wall 34 with openings 54 being positionally located substantially in the neighborhood of wall 34 at a maximum radial distance when taken with respect to an axis of central passageway 32. In this manner, particulate material is introduced into internal chamber 56 of housing element 14. Particulate material introduced to internal chamber 56 is collected therein but more importantly is ejected from internal chamber 40 of each of gas purification elements 16. Particulate materials collected within housing element 14 are captured therein and are maintained for a predetermined length of time until elements 16 are removed and the particulate material disposed of. In this manner, particulate material from the exhaust gases of the combustion chamber are captured within the overall exhaust gas pollution control system 10 of the subject invention and are stopped from passing to the ambient environment.

Each of gas purification elements 16 further include gaseous ejection openings 58 formed through contour wall 34 in a portion of wall member 34 substantially adjacent central passageway 32 for reintroduction of exhaust gases to central passageway 32. It is to be understood that exhaust gases passing in an arcuate manner within internal chambers 40 of gas purification elements 16 do not necessarily make one circular pass but may provide a multiplicity of circular paths prior to expulsion of the particulate matter through ejection openings 54 and ejection of exhaust gases through ejection openings 58.

Exhaust gases being reintroduced into central passageway 32 through ejection openings 58 then may mix with other gaseous flow through central passageway 32 and be passed or introduced into a portion of central passageway 32 adjacent to a next succeeding gas purification element 16. In this manner, there is an iterative type of purification within each of gas purification elements 16 and further between successively mounted gas purification elements 16 within housing or sheath element 14. As can be seen in FIG. 1, there are a multiplicity of gas purification elements adjacently mounted each to the other in a longitudinal direction 12 in a manner such that central passageways 32 of each of elements 16 are aligned. Thus, purification of exhaust gases may become increasingly actuated as the exhaust gases pass through pollution control system 10.

In order to chemically purify the exhaust gases within each of gas purification elements 16, it is well-known in the art that catalytic conversion materials may be utilized to provide the necessary reaction chambers. Such catalytic effects may be achieved by using different metals within the overall donut shape, or by electroplating walls 34 with particular metallic compositions. Inner surfaces may be electroplated or the entire wall 34 may be formed of such catalytic converting material as platinum, magnesium, aluminum, copper, and/or boron. In particular, when a plurality of gas purification systems are being utilized in the manner shown in FIG. 1, each of walls 34 of successive elements 16 may be formed of differing catalytic conversion material compositions to provide differing chemical reactions. Additionally, the particular wall 34 of each individual gas purification system may be electroplated or otherwise formed of differing catalytic conversion material compositions as has hereinbefore been generally described to provide different reactions at different points within the arcuate path of the exhaust gas within internal chambers 40. It is further to be understood that catalytic conversion particulate material may also be contained within chambers 56 to provide further reactions of a purifying nature. One such type of material is commonly referred to as Colemanite which has been found useful in various chemical purification phases. It is to be further noted that outer surfaces 60 of wall 34 may also be electroplated or formed of a differing catalytic conversion material composition than that provided for the surfaces defining internal chambers 40. In this manner, additional chemical reactions may be provided as the exhaust gases pass external to each purification element 16.

The exhaust gas pollution control system 10 of the subject invention further provides for a unique combinatorial method for reducing both chemical and audio exhaust gas pollution. Initially, the exhaust gases are introduced into central passageway 32 of an exhaust gas purification element 16, which has an open contour donut shape as defined by contour wall 34. A portion of the exhaust gases are then directed internal to exhaust gas purification element 16. Particulate matter contained within the exhaust gas are ejected from element 16 to a location external to element 16 within chamber 56 of housing 14. A portion of the exhaust gases within chamber 40 of exhaust gas purification element 16 are then re-introduced into central passageway 32 for either further purification in a next successive element 16, or for passage to an external atmosphere.

As has been described, the step of directing a portion of the exhaust gases into chambers 40 of elements 16 includes the step of arcuately driving the incoming portion of the exhaust gases within element 16 through the particularly spiralled wall contour. The velocity of the incoming exhaust gases internal to element 16 is increased by establishing a pressure differential between central passageway 32 exhaust gases and internal chamber 40 of element 16. The increasing velocity is established by a predetermined entrance passageway 44 contour where the exhaust gases have an entrance area 46 and an exit area 48 providing an increasing flow area from entrance area 46 to exit area 48. This particular area contouring allows for a nozzle or Venturi effect to increase and accelerate the gas velocity.

Once the exhaust gases have entered chamber 40 of element 16, they are catalytically converted within chamber 16 by chemical reactions formed by particular catalytic conversion materials either formed in an electroplating manner on an inner surface of walls 34, or by the composition of wall 34. Exhaust gases are ejected to central passageway 32 and an outer surface of wall 34 may similarly be electroplated with a particular catalytically converting material to provide further reaction phases. The exhaust gases may be passed through particulate material contained within chambers 40 to further provide chemical reactions of a purifying nature.

The step of ejecting particulate matter from internal to gas purification element 16 may be followed by the step of collecting the particulate matter external to element 16 within chamber 56 of sheath element 14.

In the manner as has hereinbefore been described, the subject invention provides for both a system 10 and a method for reducing audio levels of exhaust gases passing from a combustion chamber, as well as for collecting particulate matter contained within the exhaust gases, and further for chemically reacting certain constituents of the exhaust gases for purification purposes and objectives. Dependent upon the number of gas purification elements 16 contained within control system 10, there is an increasing purification level of the exhaust gases prior to emission through exit exhaust pipe 22. Additionally, elements 16 may be formed in a modular manner when taken with respect to pollution control system 10. Element 16 may be frictionally mounted or force fitted one against the other within a housing or sheath 14. When the particulate material within housing 14 accumulates to a predetermined amount or when the catalytic conversion reactions are diminished in efficiency, purification elements 16 may be removed and cleaned or otherwise replaced before reinsertion within housing elements 14. Additionally, during this phase, housing element 14 may be handled for cleaning purposes to remove the particulate material. Upon completion, purification element 16 may be reinserted within housing 14 for reintroduction into the exhaust gas system.

Although this invention has been described in connection with specific forms and embodiments thereof, it will be appreciated that various modifications other than those discussed above may be resorted to without departing from the spirit or scope of the invention. For example, equivalent elements or method steps may be substituted for those specifically shown and described. Certain structures may be used independently of others, and in certain cases, particular locations of elements may be reversed or interposed, all without departing from the spirit or the scope of the invention as defined in the appended claims.

What is claimed is:

1. An exhaust gas pollution control system for reducing exhaust gas audio levels, particulate and chemical waste materials emitted to the atmosphere subsequent to exhaust gases passing from a combustion chamber, comprising:
    (a) a housing element extending in a longitudinal direction having an inlet section for entrance of said gases passing from said combustion chamber;
    (b) at least one exhaust gas purification separation element inserted within said housing element, said exhaust gas purification element forming a generally donut-shaped contour having a central passageway and being of open contour for introduction of said exhaust gases internal said exhaust gas purification element adjacent said central passageway, said exhaust gas purification element defining a predetermined contour wall member having (1) particulate ejection openings formed through said predetermined contour wall member, said particulate ejection openings being positionally located at a substantially maximum radial distance when taken with respect to said central passageway for introduction of said particulate material into said housing element, and, (2) gaseous ejection openings formed through said predetermined contour wall member being positionally located substantially adjacent said central passageway for reintroduction of said exhaust gases into said central passageway; and,
    (c) means for increasing the velocity of said exhaust gases from said central passageway upon introduction of said exhaust gases internal said exhaust gas purification element, said predetermined contour wall member being formed of a catalytic conversion material composition.

2. The exhaust gas pollution control system as recited in claim 1 where said catalytic conversion material is platinum.

3. The exhaust gas pollution control system as recited in claim 1 where said predetermined contour wall member is formed of a plurality of catalytic conversion material sections.

4. The exhaust gas pollution control system as recited in claim 1 including catalytic conversion material contained within said exhaust gas purification element.

5. A method for reducing exhaust gas audio levels, particulate and chemical waste materials emitted to the atmosphere subsequent to exhaust gases passing from a combustion chamber, including the steps of:
    (a) introducing said exhaust gases into a central passageway of an exhaust gas purification element having an open contour donut shape;
    (b) directing a portion of said exhaust gases internal said exhaust gas purification element from said central passageway;
    (c) catalytically converting said exhaust gases within said exhaust gas purification element;
    (d) circumferentially transporting said exhaust gases within said gas purification element;
    (e) increasing the velocity of said portion of said exhaust gases directed into said exhaust gas purification element when taken with respect to a velocity of said exhaust gas within said central passageway;
    (f) ejecting particulate matter through particulate ejection openings formed through a wall of said gas purification element, said particulate ejection openings being located at a substantially maximum radial distance when taken with respect to said central passageway; and,
    (g) reintroducing a portion of said exhaust gases within said exhaust gas purification element to said central passageway through gaseous ejection openings formed through said wall of said gas purification element, said gaseous ejection openings being located substantially adjacent said central passageway.

6. The method for reducing exhaust gas audio levels, particulate and chemical waste materials as recited in claim 5 where the step of catalytically converting said exhaust gases includes the steps of passing said exhaust gases adjacent a wall of said exhaust gas purification element formed of a catalytic conversion material.

7. The method for reducing exhaust gas audio levels, particulate and chemical waste materials as recited in claim 5 where the step of catalytically converting said exhaust gases includes the steps of passing said exhaust gases through catalytic conversion material maintained within said exhaust gas purification element.

* * * * *